(12) United States Patent
Mueller et al.

(10) Patent No.: US 8,278,583 B2
(45) Date of Patent: Oct. 2, 2012

(54) METHOD AND WELDING DEVICE FOR THE EVALUATION OF THE WELDING CURRENT INTENSITY DURING THE WELDING OF CONTAINER BODIES

(75) Inventors: Willi Mueller, Oberwil-Lieli (CH); Daniel Dietrich, Hittnau (CH)

(73) Assignee: Soudronic AG, Bergdietikon (CH)

( * ) Notice: Subject to any disclaimer, the term of this patent is extended or adjusted under 35 U.S.C. 154(b) by 287 days.

(21) Appl. No.: 12/828,425

(22) Filed: Jul. 1, 2010

(65) Prior Publication Data
US 2011/0000892 A1 Jan. 6, 2011

(30) Foreign Application Priority Data

Jul. 2, 2009 (CH) .................................. 1027/09

(51) Int. Cl.
B23K 9/028 (2006.01)
B23K 9/02 (2006.01)
B23K 31/02 (2006.01)
B23K 1/16 (2006.01)
B23K 11/08 (2006.01)
B23K 11/00 (2006.01)
B23K 1/00 (2006.01)
B23K 11/06 (2006.01)
B23K 9/28 (2006.01)
B23K 37/02 (2006.01)
B23K 9/32 (2006.01)
B23K 11/10 (2006.01)

(52) U.S. Cl. .................... 219/59.1; 219/60 R; 219/60.2; 219/61; 219/60 A; 219/61.2; 219/61.4; 219/61.5; 219/61.6; 219/62; 219/67; 219/78.01; 219/85.13; 219/85.19; 219/85.22; 219/81; 219/82; 219/83; 219/84; 219/86.1; 219/86.8; 219/87; 219/91.1; 219/91.2

(58) Field of Classification Search ................. 219/59.1, 219/60 R, 60.2, 61, 60 A, 61.2, 61.4, 61.5, 219/61.6, 62, 67, 78.01, 85.13, 85.19, 85.22, 219/81, 82, 83, 84, 86.1, 86.7, 86.8, 87, 91.1, 219/91.2
See application file for complete search history.

(56) References Cited

U.S. PATENT DOCUMENTS 3,586,815 A * 6/1971 Van Eijnsbergen et al. .... 219/90
(Continued)

FOREIGN PATENT DOCUMENTS
CH 653786 A5 1/1986
(Continued)

OTHER PUBLICATIONS

International search report for EP 10 00 6228 dated Nov. 2, 2010.

Primary Examiner — David Zarneke
(74) Attorney, Agent, or Firm — McCormick, Paulding & Huber LLP

(57) ABSTRACT

In order to evaluate the welding current for the resistance seam welding of an overlap seam of container bodies, a welding with changing welding current intensity is carried out for a container body of the production series, resulting in a changing welding of the seam, ranging from the welding with a too high temperature to the welding with a too low temperature. The electric energy for this welding is determined several times during this welding and/or the temperature of the weld seam is determined several times and the welding current intensity is determined at which the welding of the individual container body is too cold and the welding current intensity at which the welding is too hot. This determination is based on the determined electric energy values and/or on the determined temperature values and based on this determination a preferred range for the welding current intensity within these limits of too hot and too cold is determined. By this, an evaluation if the welding current intensity is correct may take place in a simple way during the production. After the welding of the individual container bodies a changed welding current intensity lying between the welding current intensity of the too hot and of the too cold welding may optionally be set and used for the following series of container bodies of the production series.

24 Claims, 4 Drawing Sheets

U.S. PATENT DOCUMENTS

| | | | | |
|---|---|---|---|---|
| 3,746,829 A | * | 7/1973 | Petzold | 219/110 |
| 4,447,698 A | * | 5/1984 | Van Sikle et al. | 219/110 |
| 4,621,176 A | * | 11/1986 | Kliesch et al. | 219/608 |
| 4,714,816 A | * | 12/1987 | Pazzaglia | 219/109 |
| 4,734,640 A | * | 3/1988 | Kitahori et al. | 324/127 |
| 4,887,025 A | * | 12/1989 | Re Fiorentin et al. | 324/693 |
| 5,291,423 A | | 3/1994 | Röösli | |
| 6,479,784 B1 | * | 11/2002 | Tagliavini | 219/109 |
| 7,335,853 B2 | * | 2/2008 | McGushion | 219/137 PS |

FOREIGN PATENT DOCUMENTS

EP  2110196 A2  10/2009

* cited by examiner

METHOD AND WELDING DEVICE FOR THE EVALUATION OF THE WELDING CURRENT INTENSITY DURING THE WELDING OF CONTAINER BODIES

CROSS REFERENCE TO RELATED APPLICATIONS

This application claims the priority of Swiss patent application 1027/09, filed Jul. 2, 2009, the disclosure of which is incorporated herein by reference in its entirety.

BACKGROUND

The invention relates to a method for evaluating the applied welding current intensity during electrical resistance seam welding of overlap seams of consecutive container bodies of a production series. Furthermore, the invention relates to a welding device for the resistance seam welding of container bodies, comprising welding rollers, a welding current generator and a welding current controller, as well as an installation for the multiple detection along the welding seam of a container body of the electrical energy brought into the welding seam and/or for the multiple detection of the temperature of the welding seam of a container body along the welding seam.

Furthermore, the invention is related to a method and a welding device for welding container body seam welds with non-uniform overlapping of the edges of the container body material.

PRIOR ART

For the determination of the welding range, particularly for quality control and possible adjustment of the welding current during the running production of a series of container bodies, it is common to remove a welded body during the production and to determine by means of visual verification and mechanical strength testing, if the welding conditions were too hot or too cold. According to the inspection result, the welding machine may be stopped, the current may be changed and it may be welded and inspected again. Because this is an iterative process, its duration and the material consumption or the sample body usage respectively are strongly dependent on the experience of the operating personnel.

As well for the initial adjustment of the welding current intensity for resistance seam welding of container bodies it is common upon starting production of a production series of bodies to carry out test weldings with small body series made of the respective material to be welded, wherein, as in the actual production welding, it is worked with a constant welding current intensity of the welding alternating current. The welded bodies of such a small series are then inspected by means of mechanical strength verification (for example tearing open the welded overlap seam) and visual verification as well. If the welding current intensity was set too low during the test welding or if the temperature was too low respectively, the seam opens easily because insufficient melting of the material took place, which effect is called "gluing". On the contrary, if the welding current intensity during the test welding was set too high, the welding takes place with a too high temperature and craters are created and liquid body material or welding electrode material is deposited as "spatters" along the seam. This makes the body unusable for further utilization. After such test weldings, in the course of which the operators normally produce both testing bodies with "gluing" welding seams and test bodies with welding seams with "spatters", the welding current intensity used for the series production of bodies made out of this metal sheet type is then set. The welding current intensity is adjusted in the range between said "gluing" and said "spatters" with about 2/3 distance from the too low value and consequently about 1/3 distance from the too high value. During this iterative process, the time consumption and the material usage caused by the test series depends strongly on the size of the welding range of the body material and on the experience of the operators of the body welding machine. In European Patent Application Nr. 09 005 412.3 it is proposed to weld a test body at the beginning of the production with a falling or a rising welding current value and to subsequently inspect the body visually and mechanically. By this, the number of used bodies for the determination of the welding current before the production may be reduced. The evaluation of the welding during the actual production of containers is thereby however not enhanced. It is carried out further on by removing and verifying a body which was welded during production.

SUMMARY OF THE INVENTION

The invention has the task of creating a better and thereby a normally faster and in any case a material saving method for verifying the welding current intensity during the welding of container bodies in the production series. Furthermore, the invention has the task of creating a welding device for carrying out the method.

In case of the aforementioned method, this task is solved by welding during production and under control of a controller of the resistance welding machine a first set of consecutive container bodies with a predetermined, substantially constant welding current intensity, by welding, after said first set of container bodies, and under control of said controller at least a single container body from the production series with a falling or rising welding current intensity during the welding of its seam and by measuring or determining the electric energy several times during welding of said seam and/or by measuring the temperature of the weld seam several times during welding of said seam, and by determining by means of said measured or determined values of the electric energy and/or said measured values of the temperature, the respective current intensity limit at which the welding of said single container body with said falling or rising welding current intensity has taken place in a too cold manner and the respective current intensity limit at which the welding has taken place in a too hot manner, and by selecting within these limits based on this determination a preferred value range or a preferred value for the welding current intensity.

Thus, it is determined in a production series, based on measurement values during a special welding with falling or rising welding current intensity, where the limits of the welding current intensity for too cold or too hot welding respectively lie, and therefore it may be done without the visual verification and the mechanical strength verification. Thus, even a user with little experience in welding technology and without special knowledge of the system characteristics (for example production speed, welding pressure) and of the constitution of the metal sheet material to be welded may evaluate if the currently used or set welding current intensity during the production lies in an appropriate range or not. Manipulation errors are thus avoided because no mechanical verification and visual verification has to be carried out. Furthermore, idle times of the production line are avoided and the efficiency of the machine is increased.

In a preferred embodiment it is recorded if the welding current intensity used for the production series lies in the preferred range determined in this way or if it has the preferred value or not. By this, a reliable quality assurance may take place, which is automatically executed without visual verification and mechanical strength verification and which enables a program controlled traceable record for the quality assurance.

In case of a further preferred embodiment it is verified, preferably automatically, if the welding current intensity used for the production series lies within the preferred range or if it has the exact preferred value, and if this is not the case, a new welding current intensity is set by the controller, preferably also automatically, which is then applied to the container bodies of the production series following the container body which was welded with the falling or the rising current. By this, changes in influence factors relevant for the welding current may be compensated by a simple readjustment which preferably takes place automatically and which may particularly take place periodically.

For the welding device, the object of the invention is met in that the welding current intensity is changed by means of the welding current controller and/or of the welding current generator of the welding device to result in a falling or rising welding current intensity during the welding of a seam of a container body and that a too hot welding or a too cold welding resulting from the changing welding current is determinable by means of the installation for the multiple measurement and the welding current controller as defined in the claim.

By this, the same advantages result for the welding device as explained above for the method. Preferred embodiments of the welding device are claimed in the dependent claims and result in the advantages described for the preferred methods.

In the following, a further aspect of the invention will be described.

In European Patent Application Nr. 09 005 413.1 it is proposed to proceed with the welding by means of electrical resistance seam welding of production series of container bodies in case of container bodies with unequal overlapping of their seam in such a way that, during the production, a welding current intensity which falls or rises along its seam is used for each body of this type. This allows the welding with a higher current intensity in the areas with a higher degree of overlapping than in the areas with a lower degree of overlapping of the body edges, where it is then welded with low current intensity.

According to the further aspect of the present invention, the evaluation or verification, respectively, of the adherence to the optimum welding current intensity course for this takes place with the method according to the above first aspect of the invention. For this, the optimum current intensity value for the welding in the area of large overlapping and in the area of small overlapping is determined by means of this method (thus with falling or rising welding current intensity) for at least one body, optionally for two or more bodies featuring such a non-uniform overlapping, by means of measuring several times the supplied electric welding energy along the seam and/or the temperature along the seam. The welding current intensity for the production is then usually chosen as a ramp-shaped current course which connects these two current intensities. The second aspect of the invention also comprises appropriate welding devices for carrying out the methods.

BRIEF DESCRIPTION OF THE DRAWINGS

In the following, embodiments of the different aspects of the invention will be further explained by means of the figures.

DESCRIPTION OF THE PREFERRED EMBODIMENTS

Figure 1:
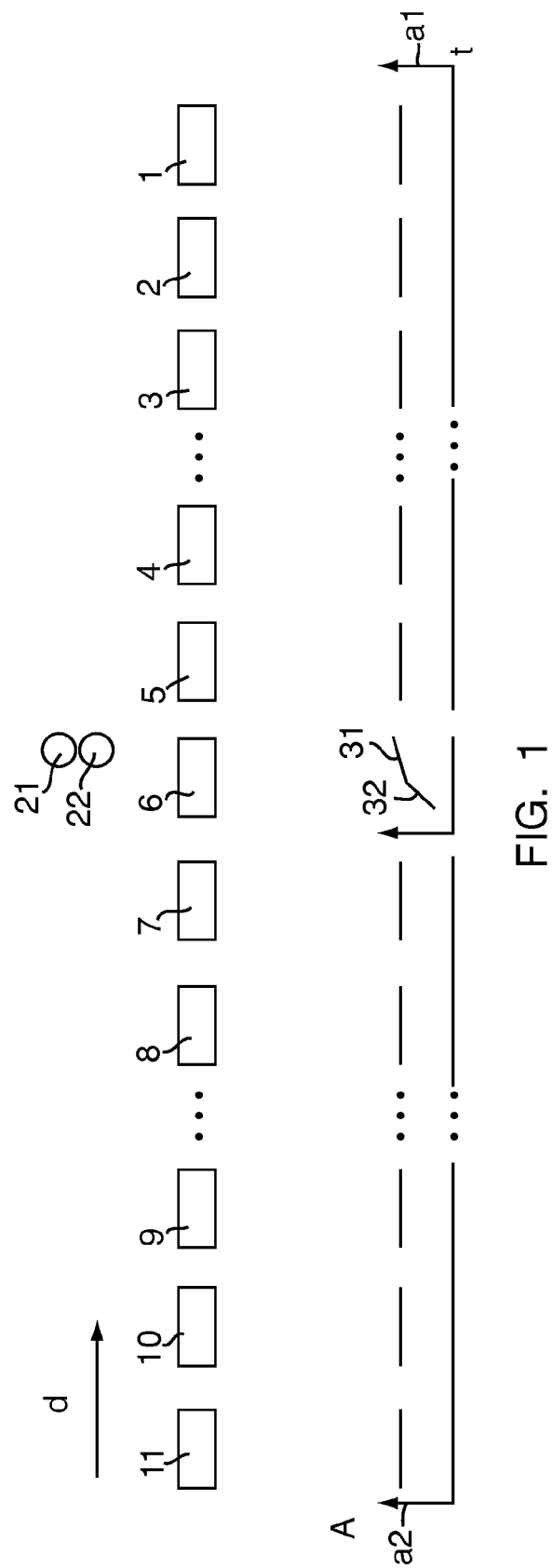
FIG. 1 schematically illustrates the welding of a number of container bodies of a production series and the welding current used there.

FIG. 1 shows schematically a sequence of container bodies 1 to 11 of a production series of container bodies. The container bodies are welded for example on a resistance welding machine according to FIG. 4, of which only the welding rollers 21 and 22 are shown in FIG. 1. The single container bodies are fed as body blanks from a rounding device into the welding device and travel through it in the direction of arrow d. Thus, the container body blanks 11 to 7 upstream of the welding rollers are not yet welded in the schematic view of FIG. 1, the container body 6 is just being welded and the container bodies 5 to 1 downstream of the welding rollers have already been welded.

The welding of the series of container bodies 1 to 5 has been carried out in a known way with a substantially constant welding current intensity. The welding current as a function of time is shown in a rough schematic way below the container bodies. The vertical axis denotes the welding current intensity in Amperes (A) and the horizontal axis the time t. It is shown that the series of container bodies 1 to 5 were welded with a substantially constant welding current with the intensity a1. This welding current was determined before the start of the production of the production series, in a known way as mentioned at the beginning and particularly according to the process described in the European patent application No. 09 005 412.3. However, this determination and adjustment of the welding current and particularly of the welding current intensity before production start of the series production does not constitute an object of this invention. As known to the skilled person, the welding current is an alternating current which produces along the seam a large amount of single welding nuggets, which together form the weld seam and which results in a consolidated welding of the longitudinal seam of the container bodies. This is known and does not have to be described here in further detail. As explained at the beginning, the welding current intensity (in Amperes) is a central aspect for the question whether the welding has been carried out correctly or if only a "gluing" welding seam with poor consolidation is created because of a too cold welding, or whether a welding seam with "spatters" is created because of a too hot welding, this being unsuitable for the further processing of the container body. Now, during the welding of the production series, the following procedure is used in order to evaluate if the current intensity a1 which was determined and set at the beginning produces a correct welding seam or not. This evaluation is particularly usable for quality assurance or for the documentation of a correct production respectively, however also for the adjustment of the welding current intensity during the production of the production series of container bodies, because the welding conditions may vary during the production series.

Figure 2:
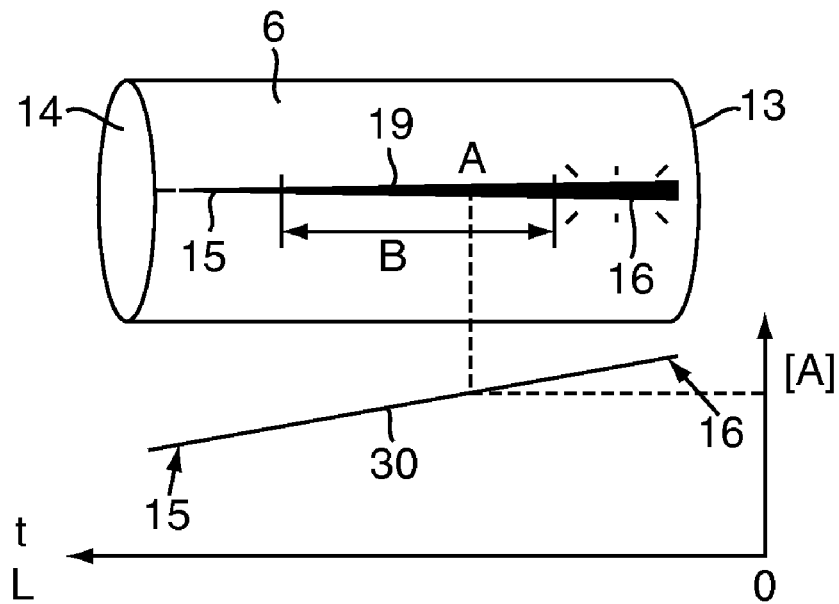
FIG. 2 is a schematical view of a welding seam of a container body and of the course of the welding current intensity (in Amperes) as a function of the seam or of the time respectively.
Figure 3:
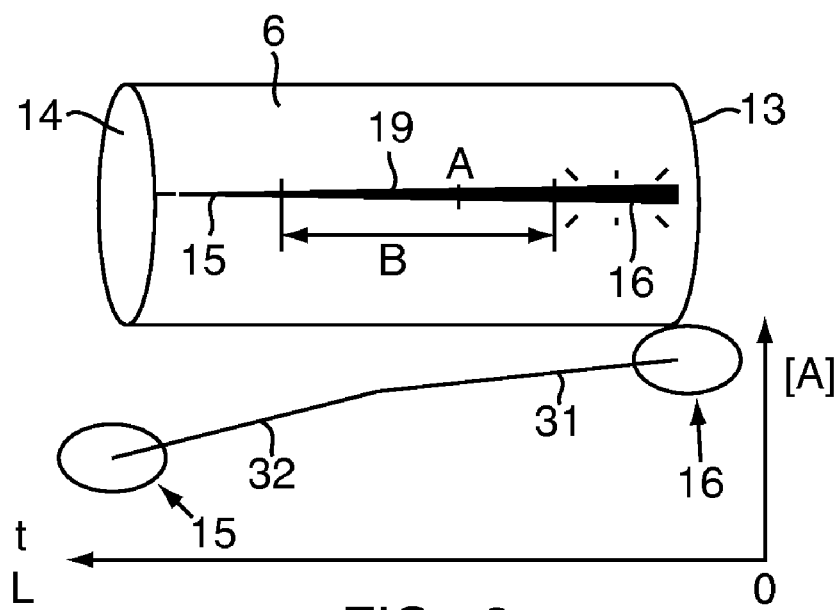
FIG. 3 is a further schematical view of a welding seam of a container body and of the course of the welding current intensity for explaining a preferred embodiment of the invention.

According to the invention, at least one container body 6 is welded with a falling or rising course of the welding current intensity after the series of container bodies 1-5, which were welded with the constant welding current intensity a1. This special welding may be carried out periodically after a preset number of container bodies of the series, for example after 500 or after 1000 already welded container bodies, or it may take place randomly controlled after a random number of bodies, or it is triggered by the operator. FIGS. 2 and 3 show two different variants of the way how this welding with falling or rising welding current intensity may take place.

FIG. 2 and FIG. 3 each show schematically the container body 6 from the series of FIG. 1 with a top view on the welding seam as well as a diagram shown directly underneath the body 6 showing the curve of the welding current intensity (in Amperes on the vertical axis) over the weld seam length L or weld time t, respectively, on the horizontal axis. According to the invention, the intensity of the welding current is changed in a falling or a rising manner during the welding of body 6 along the overlapping weld seam. In the example shown in FIG. 2, the welding current intensity 30 decreases during the welding time or over the length of the weld seam, respectively, and thereby falls from a higher initial value to a lower end value. The welding current for the welding of container bodies is an alternating current usually with a higher frequency as the mains voltage frequency. This is known to the skilled person and is therefore not explained in more detail here. An overlapping weld seam is produced along the weld seam 19 of the container body 6 of the series from its front 13 to its end 14 (related to the transport direction of the body according to the arrow d of FIG. 1) with an area 16 with a too high welding temperature and the presence of "spatters" is formed, as well as an area 15 with a too low welding temperature creating a cold welding seam or a so-called "gluing" seam which doesn't provide a sufficient welding. Because of the change of the welding current intensity, a welding area shown by arrow B is present along seam 19 and between these areas 16 and 15, in which a welding without spatters and with a sufficient welding temperature is occurs. In the shown illustration, the higher welding current intensity is used at the beginning of the body and the welding current 30 decreases in intensity towards the end of the seam or the end 14 of the body, respectively. An inverse procedure is also possible, in case of which welding of seam 19 is started with a low welding current intensity at the front 13 of the body and the welding current intensity increases along the seam. In this case, the area 15 would be located at the front 13 of the body and the area of spatters 16 at the end 14 of the body. In between, a correct welding area shown by arrow B would again be created. By this, a container body 6 may be formed in the production series according to the invention, having the entire welding current range from a too high welding current intensity to a too low welding current intensity on the seam of this single particular body 6. In a preferred embodiment it is started with the too high current, as shown in FIG. 2. Arrow C shows to a section of the welding current curve with a current value resulting in "spatter" and arrow E shows to a section of the welding current curve with a current value causing "glueing".

FIG. 3 shows a further preferred embodiment also shown schematically in FIG. 1, in case of which the previous explanations are also valid. Same reference numerals again denote same elements. In case of this embodiment, it is not welded with a constantly falling or constantly rising welding current intensity 30, but with a current curve having at least two different slopes and a respective inflexion point (as shown) or several inflexion points. In FIG. 3, both sections 31 and 32 of the current intensity curve are shown as functions of the seam length or the welding time respectively. Thereby, the slope of the falling ramp is smaller in the area of the higher current and the slope in the area of the lower current 32 is higher. By this the spatter boundary on the seam between the areas 16 and 19 is created with a higher resolution.

Figure 4:
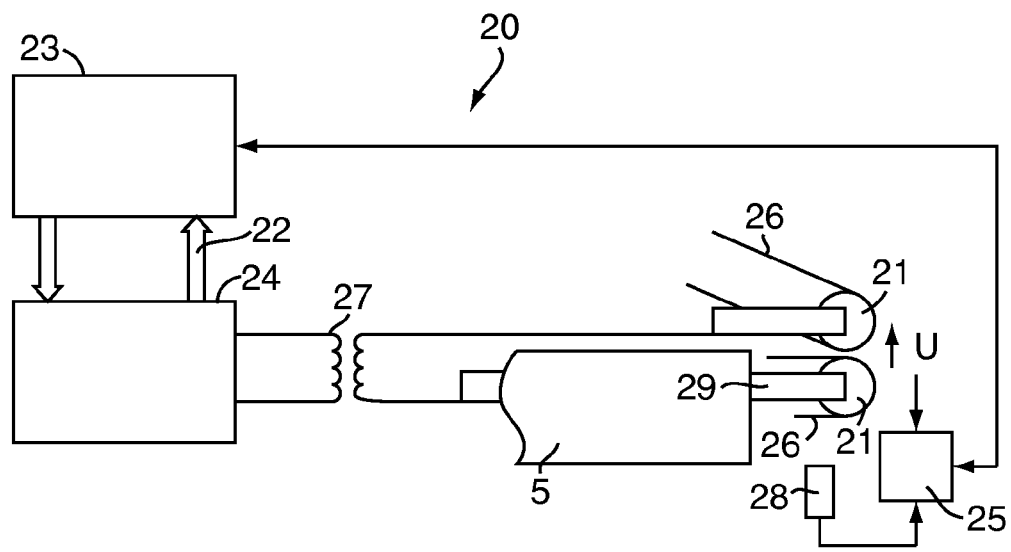
FIG. 4 schematically illustrates a welding device for the resistance seam welding of container bodies according to the aspects of the invention.

FIG. 4 shows schematically a resistance seam welding machine or a roller seam welding machine 20, respectively, provided with welding rollers 21 and 22 between which the seam of the container bodies (part of can body 5 is shown as an example) is welded in a known way. Wire intermediary electrodes 26 respectively may run on the welding rollers. The lower welding roller 22 is supported by a welding arm 29 and is supplied with current by the welding current generator 24 via the welding current transformer 27. As known to the skilled person the welding current generator can detect by means of an external sensor, or by means of a detection which is integrated into the welding current generator, when body 5 enters between the welding rollers. The welding current generator then controls the application of the welding current to the upper welding roller 21. This is known to the skilled person and is not explained in more detail here. A controller 23 may furthermore control the welding current generator 24 and provide it periodically or randomly, for a body 6 of FIG. 1, with the desired ramp-shaped curve of the welding current, which, in this case, is contained as a default value in the controller. The ramp-shaped curve may however also be set or stored in the welding current generator itself and be activated for the welding by an external signal. A processor-controlled welding current generator allowing to set the welding current according to the invention is a welding current generator of the type Pulsar or UNISOUD of the company Soudronic, Bergdietikon, Switzerland. The controller 23 may furthermore determine each momentary current intensity provided to the welding rollers, be this on the one hand by measurement or on the other hand by comparison of the welding time or the welding seam length, respectively, to the set value of the current intensity according to the ramp. As a variant it is shown in FIG. 4 that the electrical connections between controller 23 and generator 24 may also provide a current intensity output signal 22 of the generator to the controller 23. Alternatively, a separate current intensity measurement installation may be provided, supplying the welding current intensity to the controller.

During the welding of the container body 6 with the falling or the rising welding current value respectively, the electrical energy being input into the welding seam is measured or determined from the set current curve and/or the temperature of the welding seam is measured, in order to determine the boundary of the area 16 which was welded too hot to the area which was welded correctly or the boundary of the correctly welded area to the area 15 which was welded too cold, based on known default boundary values for the energy or the temperature, respectively, that is needed for a given sheet material for a correct weld. For this, a device 25, which may be a computer or a voltmeter or a thermometer, is schematically shown in FIG. 4, being able to determine the electric welding energy several times during the welding of the container body 6 and/or to measure the temperature of the welding seam several times during the welding of the container body 6. Particularly an IR-thermometer sensor 28 may be provided for measuring the temperature, being connected to the device 25 or to a part of it. For the determination of the electric energy, the device 25 may measure the voltage U between the welding electrodes and particularly between the welding rollers 21, 22 several times during the welding. Because furthermore the current welding current is known by the set curve thereof, the welding energy can be determined. This may take place in the device 25 by supplying the current value from the controller 23 to the device 25 (or this is done by the welding current generator). Otherwise, the device 25 may also supply the voltage value U to the controller 23 and the latter determines the electric energy. The device 25 may also measure the welding current itself. A known device 25 available on the market is the "Weld Monitor SWM-2" by the company Soudronic, Bergdietikon, Switzerland. This device 25 allows the computation of the electric energy in each welding nugget, by measuring the corresponding voltage drop between the welding rollers for each welding nugget and by taking into account the welding current for each nugget. Furthermore, the device 25 as embodied by this known "Weld Monitor" allows a sampling of the heat radiation emerging out of the welding seam 2000 times per second.

Figure 5:
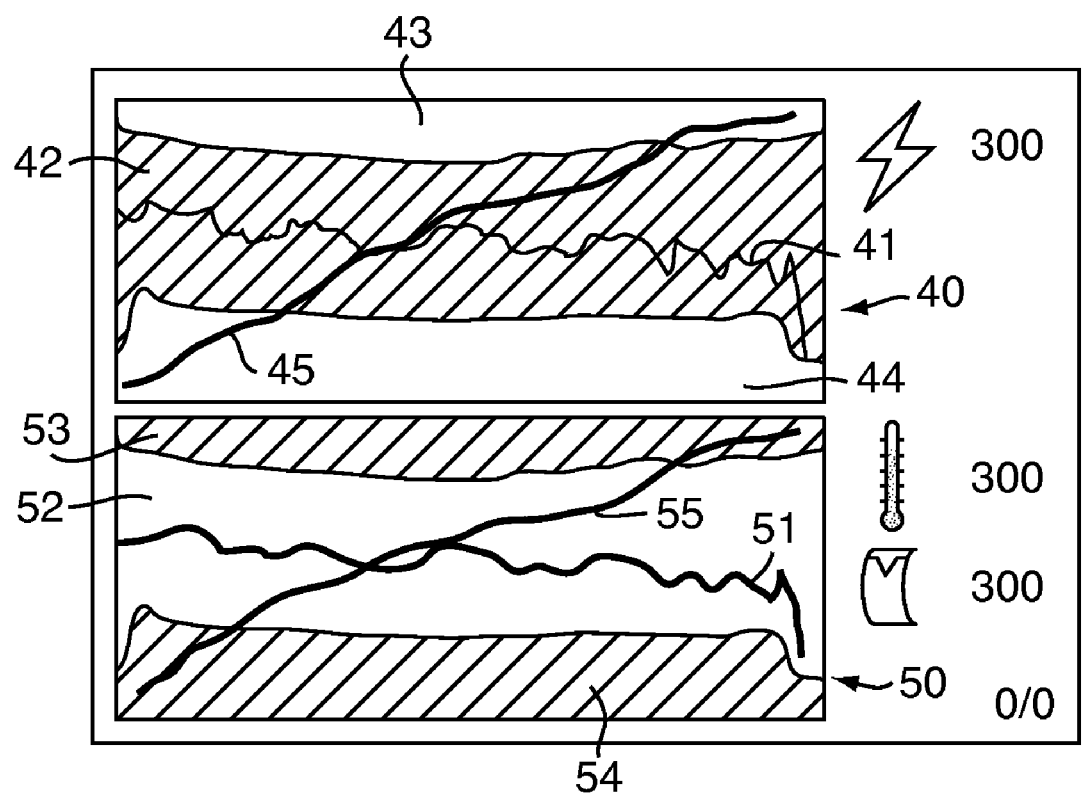
FIG. 5 is the view of a monitor of the installation for acquiring the electrical welding energy and/or the temperature during the welding.

FIG. 5 shows a presentation of a part of the operating and displaying interface of this known device 25. Since the electric energy has a meaning in connection with the present invention, this can be explained by means of the display field 40 or, since the temperature of the welding seam has a meaning in connection with the present invention this can be explained by means of the display in field 50 respectively, which is why it is not elaborated on the other parts or symbols respectively of the operating and displaying interface of the known "Weld Monitor" which are not shown in FIG. 5.

Field 40 shows the electric welding energy along the weld seam of a container body (as result of the determination of the welding energy brought into each welding nugget during the welding of the container body weld seam). Curve 41 shows as an example the welding of one of the container bodies 1 to 5 with the constant welding current a1 of FIG. 1. In field 40, a dark-grey area 42 shows the admissible energy range (which is known from experience to be admissible for the metal sheet material of the containers) on the monitor display and a light-grey area 43 is shown, where the electric energy supplied to the welding seam is too high and a light-grey area 44 is shown, where the electric energy supplied to the welding seam is too low. According to this, if the seam is welded such that the electric energy brought into the weld seam lies in the area 43 of the display of the weld monitor or device 25, respectively, "spatters" would be produced on the weld seam and if the energy brought into the weld seam would be shown as being in the area 44 a "gluing" weld seam would be produced. Thus, there exist limit values for the electric energy, which separate areas 43, 42 and 44 from each other. These limit values are known to the skilled person or are listed in the device 25 respectively. It is shown that curve 41 runs within area 42 for bodies 1 to 5 and this production series of bodies is therefore welded correctly with the set welding current intensity a1. The same knowledge results from the temperature measurement of the weld seam or of the temperature curve 51 which is located within the admissible light-grey area 52 of the temperature and does not reach the dark-grey area with too high temperatures 53 ("spatter area") or the dark-grey area with too low temperatures 54 ("gluing area") respectively. Also for the temperature there are known corresponding limit values which are stored in device 25. The mentioned limit values may also be contained within the controller 23, such that the latter carries out the comparison of the currently measured values for energy and/or temperature with the limit values. The displaying, so far there is one provided, is done as shown with the device 25 and/or via a display unit of the controller 23. Thus, the device 25 may be completely replaced by controller 23, with the controller 23 carrying out said functions.

When during the series production container body 6 is welded with the falling or the rising current curve, the result are measurement values for the applied welding energy or/and for the temperature, respectively, which yield the too high welding current intensity or the too low welding current intensity respectively. If this is again tracked in a curve, the result is a differing curve in the fields 40 or 50, respectively, where the supplied electric energy and the temperature enter the "spatter area" and the "gluing area". This is shown as an example in FIG. 5 by the curves 45 or 55, respectively. In this example it is shown that when it is welded with the falling curve according to FIG. 2 and the supplied electric energy is therefore too high in the beginning or the weld seam temperature is too high in the beginning, such that curve 45 starts in area 43 and/or curve 55 starts in area 53, respectively. Towards the end of the weld seam with reduced welding current intensity, curve 45 is then located within area 44 and curve 55 is located within area 54. Thus, by the energy measurement/determination and/or the temperature measurement, the corresponding values indicate if the welding current intensity has a too high or a too low value, if they are compared to the limit values for the area transitions 43-42 or 42-44 respectively, and/or to the area transitions 53-52 or 52-54 respectively. Thus, the range of the welding current intensity where a correctly welded weld seam is produced, or in other words section 19 on the seam according to FIGS. 2 and 3 can be determined by means of the energy determination (or measurement) and/or temperature measurement during the welding of the body 6 with a falling (or with a rising) course of the welding current intensity. Depending from the limits of the correct area, a narrower range or an exact value for the welding current intensity may then be assumed. For example, a narrow range for the welding current intensity may be evaluated as a good range when it lies in the middle between the limits. Or a weld current value can be set which separates the range 19 (FIGS. 2 and 3) in a ratio of 2/3 to 1/3 and which is located closer to the spatter limit, as this was mentioned at the beginning and as being shown in FIGS. 2 and 3 by the point A on the weld seam which translates via time or seam length and the weld current curve to a weld current value as shown by the dotted lines in FIG. 2. This evaluation based on the measurement of the welding of the individual container body 6 with the falling or raising welding current allows evaluating where the current intensity is actually lying during the production and without an interruption of production. This evaluation may then be used in different manners.

This may be explained by means of a preferred embodiment which is schematically shown in FIG. 1. As explained, the welding took place with the current intensity a1 up to can body 5 of the production series and for this normal welding process the "Weld Monitor" may have been employed too, in order to detect a deviation for individual bodies and to possibly remove them from the production process. After a certain number of bodies of the series (which is indicated by the bodies 1-5 in FIG. 1), which may for example amount to 500 or 1000 or 5000 bodies, the welding of the at least one individual body takes place with the falling (or rising) welding current intensity (in FIG. 1 this is the container body 6). Thus, it is evaluated in the manner explained above, which value the desired current intensity should currently have in the production (for example to lie at the current value which results to point A on the weld seam as shown in FIG. 2) and it may thereby be checked if the current intensity value a1 is still lying in the desired range of current intensity or if it is the desired exact value of current intensity which results from the energy measurement/determination and/or the temperature measurement during the welding of the body 6. The controller which evaluates the measurements and thereafter calculates the desired range or the desired value may thus compare the initial set value a1 with the range or the value. If a1 lies in the desired current intensity range or in a predetermined interval to the desired value, the controller leaves the current intensity for the welding of the subsequent container bodies 7 to 11 (or for the welding of the subsequent 500 or 1000 or 5000 bodies until an individual body 6 is again welded with a falling (or a rising) current at the value a1. If however the controller detects that the value a1 is lying outside of the desired range which resulted from the measurement during the welding of the body 6, or too far from the desired exact value of the current intensity which resulted from the measurement during the welding of the body 6, the controller sets a new current intensity a2 which lies in the range or which has the exact value respectively. This is shown in FIG. 1 by having set the higher current intensity a2 for the bodies 7 to 11.

In case of another embodiment the deviation of a1 from the desired welding current intensity is only recorded, in order to create a protocol for production quality control, when a1 is lying outside of the desired range which resulted from the measurement during the welding of the body 6 or when a1 is lying too far from the desired exact value of the current intensity but the value a1 still leads to a curve 41 or 51 within the range 42 or 52. Thus in this embodiment no other current value a2 is set as long as a1 is within the limits resulting in a correctly welded weld seam.

Both embodiments may also be combined, such that in case of small deviations only recording or logging, respectively, is done and in case of larger deviations (outside a preset range for the deviation) a new current intensity value a2 is additionally set.

In the simplest embodiment it is only evaluated where a1 lies, however no action is taken or this evaluation is only passed as information to the operator respectively, such that the latter may draw conclusions for possible changes of the settings.

Thus, in order to evaluate the welding current for the resistance seam welding of an overlap seam of container bodies, a welding with changing welding current intensity is carried out for a container body of the production series, resulting in a changing welding of the seam, ranging from the welding with a too high temperature to the welding with a too low temperature. The electric energy for this welding is determined several times during this welding and/or the temperature of the weld seam is determined several times and the welding current intensity is determined at which the welding of the individual container body is too cold and the welding current intensity at which the welding is too hot. This determination is based on the determined electric energy values and/or on the determined temperature values and based on this determination a preferred range for the welding current intensity within these limits of too hot and too cold is determined. By this, an evaluation if the welding current intensity is correct may take place in a simple way during the production. After the welding of the individual container bodies a changed welding current intensity lying between the welding current intensity of the too hot and of the too cold welding may optionally be set and used for the following series of container bodies of the production series.

Figure 6:
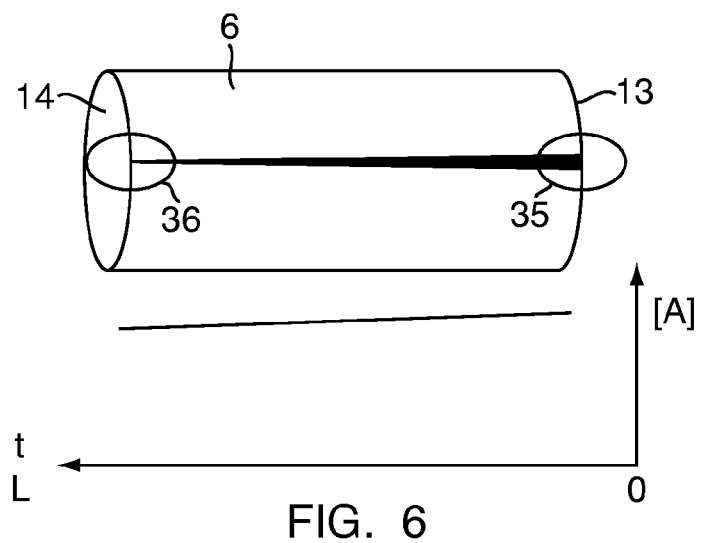
FIG. 6 is a further schematical view of a welding seam of a container body and of the course of the welding current intensity for describing a second aspect of the invention.

With reference to FIG. 6, a further aspect of the invention can be explained, which is described by means of FIG. 6 as a method which may be carried out by means of the welding device of FIG. 4. The above description with reference to FIG. 4 is thus hereby included by reference into this section of the description. It is known that it may occur during can body production that the amount of overlapping of the overlapping edge sections of the can body is not uniform along the weld seam to be welded during the production of the body blanks (caused by the cutting of the metal sheets and caused during the rounding of the body blank). In FIG. 6, such a body is shown schematically, wherein at least in section 35 at the front of the body 13 the amount of overlapping is too large and at the body end 14, at least in section 36, the amount of overlapping is too small. Such can bodies can hardly be welded with sufficient weld seam quality by ordinary means, because the constant production welding current intensity is normally not able to supply enough energy into the larger overlapping, such that a too cold welding results there, and on the other side the constant production welding current intensity supplies too much energy to the too small amount of overlapping, such that the effect of a welding with a too high temperature and spatters can be seen there. According to the second aspect of the invention it is therefore proceeded in such way that the welding during the production takes place with a corresponding falling welding current intensity, as shown in FIG. 6 by the diagram below body 6, wherein the welding current intensity is again shown on the vertical axis (in Amperes) and the welding time t or the seam length L, respectively, on the horizontal axis. If the overlapping error of the container body or the can body respectively would have a different direction, such that at the front 13 there would be an amount of overlapping being too small and at the end 14 an amount of overlapping being too large, the welding current intensity would accordingly have to increase instead of having to decrease, as shown in FIG. 6. The welding machine of FIG. 4 features the controller 23 and the welding current generator 24 (which is again for example a welding current generator of the type Pulsar or UNISOUD of the company Soudronic AG, Bergdietikon, Switzerland) according to the second aspect of the invention, such that it produces in the series production for each body of the fast sequenced bodies a corresponding falling or rising welding current intensity for the corresponding seam.

Also for this kind of welding it is provided as explained above for the first aspect of the invention, which explanation is hereby included by reference into this second aspect, that, for determining the applied and/or desired current intensity, the electric energy and/or the temperature of the weld seam is periodically measured/determined several times along the weld seam for a container body or two consecutive container bodies of the series during the welding in the production series, and that it is determined by means of the measured/determined electric energy and/or the measured temperature values the welding current intensity at which the welding of the individual container body is too cold and the welding current intensity at which a too hot welding has taken place, and that the curve of the falling or of the rising welding current intensity is evaluated and/or changed and/or logged within these limits based on this determination.

The invention claimed is:

1. A method for evaluating the applied welding current intensity during the electric resistance seam welding of overlap seams of consecutive container bodies of a production series, characterized
   in that a first series of consecutive container bodies are welded by controlling the resistance welding machine during the production with a preset, substantially constant welding current intensity a1, in that after this series of container bodies at least a single container body of the production series is welded by a falling or a rising welding current intensity during the seam welding and in that during this welding with a falling or rising welding current the electric energy is determined several times and/or the temperature of the weld seam is determined several times, and in that for this welding with falling or raising welding current the welding current intensity is determined at which the welding of the weld seam of the individual container body is too cold and the welding current intensity at which the welding of the weld seam is too hot, based on the determined electric energy values and/or on the determined temperature values, and in that, based on this determination, a preferred welding current range or a preferred welding current value within these limits is determined.

2. The method according to claim 1, wherein it is further checked if the set constant welding current intensity is lying at a preset value within the interval of the welding current intensity for too cold welding and the welding current intensity for too hot welding and particularly if the set welding current intensity is lying within a preferred range of values.

3. The method according to claim 2, wherein the position of the set welding current intensity is recorded for quality assurance purposes and is particularly determined and recorded periodically.

4. The method according to claim 1, wherein, after the welding of the single container body, a changed, substantially constant welding current intensity is set, which lies between the welding current intensity of the too cold and the welding current intensity of the too hot welding and is chosen depending on these welding current intensities, and in that this new, substantially constant current intensity is used for a series of container bodies of the production series following the single container body.

5. The method according to claim 1, wherein the welding current intensity during the welding of the at least one container body is chosen substantially linearly falling or rising.

6. The method according to claim 1, wherein the welding current intensity during the welding of the at least one container body has at least two sections with different slopes of the falling or of the rising.

7. The method according to claim 1, wherein the electric energy is determined by determining the welding current and the electric voltage drop of the welding electrodes for each welding nugget or for selected welding nuggets of the welding seam.

8. The method according to claim 1, wherein the temperature along the weld seam is measured by means of an infrared thermometer.

9. A welding device for the resistance seam welding of container bodies, comprising welding rollers, a welding current generator and a welding current controller, as well as a device for detecting the electric energy along the weld seam of a container body several times and/or for the detection of the temperature of the weld seam along the weld seam of a container body several times, characterized in that the welding current intensity during the welding of a seam of a container body is changeable by means of the welding current controller and/or the welding current generator in order to provide a falling or raising welding current curve, respectively, and in that a too hot welding and a too cold welding provided on the same weld seam by the changing welding current are determinable by the device for the multiple detection and/or by the welding current controller.

10. The welding device according to claim 9, wherein it is determinable if a set, substantially constant welding current intensity for the container body production is lying within a preset range between the welding current intensity for a too cold welding and the welding current intensity for a too hot welding.

11. The welding device according to claim 9, wherein a substantially constant welding current is settable with a welding current intensity which is lying in a preset range between the welding current intensity for a too cold welding and the welding current intensity for a too hot welding.

12. The welding device according to claim 9, wherein the changing welding current is producible with a linearly falling or rising current intensity.

13. The welding device according to claim 9, wherein the changing welding current is producible with at least two ranges of current intensities with different slopes of the falling or the rising of the current intensity.

14. The welding device according to claim 9, wherein the welding current and the electric voltage drop at the welding electrodes is determinable by the device for the multiple determinations of the electric energy for each welding nugget or for some of the welding nuggets.

15. The welding device according to claim 9, wherein the temperature along the welding seam is measurable with an infrared thermometer and the device for the multiple detections.

16. A method for evaluating the used current intensity during the resistance seam welding of overlap seams of consecutive container bodies of a production series for container bodies having an overlapping width which changes along the seam, wherein the container bodies are welded with a welding current intensity which decreases or increases during the welding of their seam, wherein the welding current intensity is chosen higher at the higher overlapping width and is chosen lower at the smaller overlapping width, wherein the electric energy and/or the temperature of the welding seam are/is periodically determined several times for a container body or two consecutive container bodies of the series, and that the welding current intensity is determined at which the welding of the individual container body is too cold and the welding current intensity at which a too hot welding has taken place, based on the determined electric energy values and/or on the determined temperature values, and that, based on this determination, the course of the falling or of the rising welding current intensity is evaluated and/or changed within these boundaries.

17. The method according to claim 16, wherein the position of the set falling or rising welding current intensity is recorded for quality assurance purposes.

18. The method according to claim 16, wherein a changed falling or rising welding current intensity which is lying between the welding current intensity of the too cold welding and the welding current intensity of the too hot welding is set after the welding of the single container body and chosen depending on these welding current intensities, and this new falling or rising welding current intensity is applied for the following series of container bodies of the production series.

19. The method according to claim 16, wherein the welding current intensity is chosen substantially linearly falling or rising during the welding of the at least one container body.

20. The method according to claim 16, wherein the welding current intensity has at least two sections with different slopes of the falling or of the rising during the welding of the at least one container body.

21. The method according to claim 16, wherein the electric energy is determined by determining the welding current and measuring the electric voltage drop at the welding electrodes for each welding nugget or for some welding nuggets along the weld seam.

22. The method according to claim 16, wherein the temperature along the weld seam is measured with an infrared thermometer.

23. A welding device for the resistance seam welding of container bodies for carrying out the method according to claim 16, comprising welding rollers, a welding current generator and a welding current controller, characterized in that the welding current intensity is changeable during the welding of a seam of a container body by means of the welding current controller and/or the welding current generator and in that a too hot welding or a too cold welding is determinable by the changing welding current by means of a device for the multiple detection and/or by the welding current controller.

24. A welding device for the resistance seam welding of container bodies for carrying out the method according to claim 16, comprising welding rollers, a welding current generator and a welding current controller, characterized in that the welding current intensity is changeable during the welding of a seam of a container body by means of the welding current controller and/or the welding current generator and in that a too hot welding or a too cold welding is determinable by the changing welding current by means of a device for the multiple detection and/or by the welding current controller wherein the welding current intensity is set to rise and fall, and the setting is recorded for quality assurance purposes.

* * * * *